Nov. 5, 1957  R. J. WHITCROFT ET AL  2,812,172
SERVO CONTROL FOR AUTOMATIC WEIGHT LOADING
Filed March 2, 1954  4 Sheets-Sheet 1

Inventors:
Robert John Whitcroft,
Norman Frank Hinton, and
Frederick Arthur Claridge,
By Ernest R. Marmont
Their Agent.

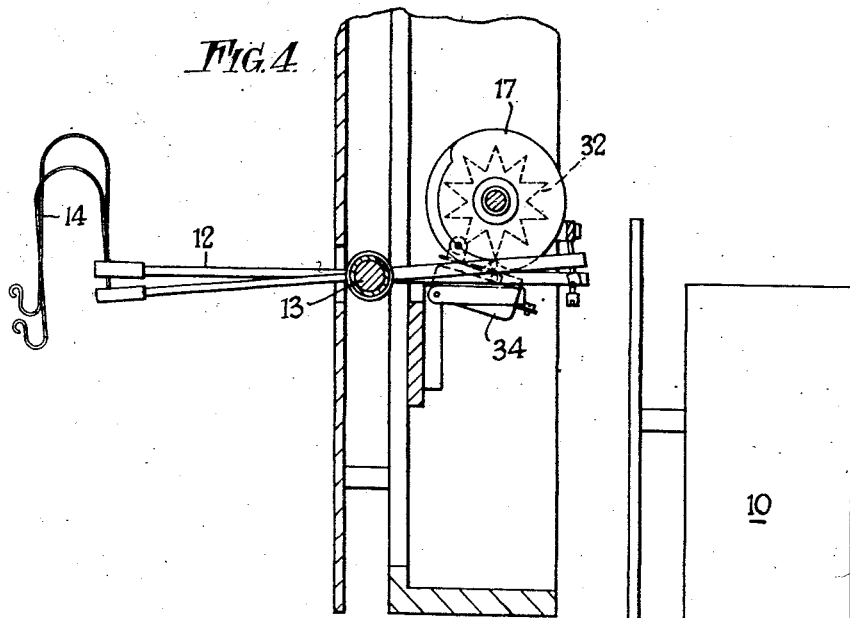
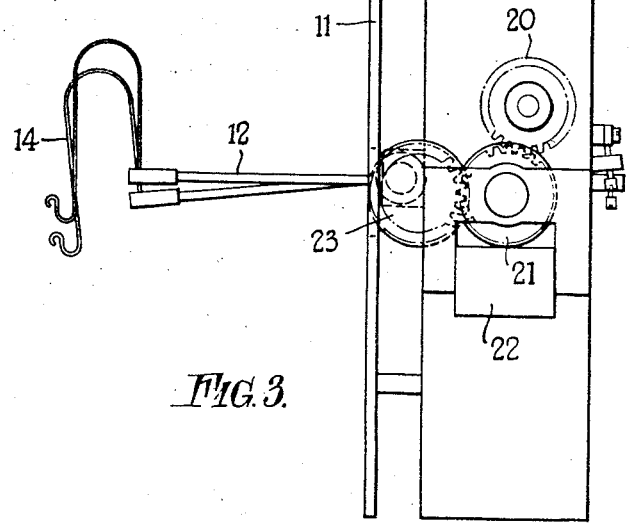

United States Patent Office 2,812,172
Patented Nov. 5, 1957

2,812,172

SERVO CONTROL FOR AUTOMATIC WEIGHT LOADING

Robert John Whitcroft, West Norwood, London, Norman Frank Hinton, Upper Norwood, London, and Frederick Arthur Claridge, Morden, England, assignors to Stanton Instruments Limited, London, England, a British company Application March 2, 1954, Serial No. 413,652

5 Claims. (Cl. 265—48)

This invention relates to improvements in the construction and operation of precision or chemical balances and is more particularly concerned with arrangements adapted or arranged for continuous or continuously recorded weighing.

In the normal precision or chemical balance it is of course known to provide manually operable mechanism for applying and removing weights. Such mechanism may comprise cams or similar devices arranged on shafts which, by the rotation of knobs or dials, may be operated to add or remove one or more weights to restore the beam to within its sensitivity range after a change of load exceeding this amount has occurred.

In the case of large weighing machines it is known to use the movement of the beam to cause the application or removal of weights but such arrangements which involve the beam doing work by its movement on the mechanism used are clearly unsuitable for use in precision balances.

In the case of continuous weighing with precision balances two different methods have hitherto been used. In the first, the range of weighing is limited to the range represented by a single deflection or excursion of the beam. In the second, the range is extended by the application or removal of a fine chain whereby the beam may be brought back to a point within its range of sensitivity after it has reached the limit of its travel. Both these two methods suffer from disadvantages, the first because of the very limited range which is available and the second because in a continuously operated arrangement the mechanism is liable to hunt over a range corresponding to the weight of one link of the chain, and further, since chain weight and sensitivity are interrelated, the range of such instruments may only be increased with a corresponding loss of sensitivity.

In the improved arrangement of the present invention, a precision balance is provided with mechanism for the step-by-step application or removal of weights and the mechanism is arranged for automatic operation when the beam moves from a position of equilibrium so that one or more weights are applied or removed to restore the beam to its initial position or to a new position within its sensitivity range. Conveniently the mechanism is caused to operate when the beam approaches either limit of its range of travel.

Operation of the mechanism by the movement of the beam may be effected in a number of ways. For example a sensing device responsive to the position of the beam may be arranged to actuate relays which in turn control the operation of the weight loading mechanism. Such a device in one form may comprise an electrical capacitance the magnitude of which varies according to the position of the beam and means responsive to change in capacitance which in turn are effective to actuate relays. In another form the device may comprise one or more photoelectric cells the illumination of which is controlled by the position of the beam while the electrical output of the cell or cells is applied to control the weight loading mechanism.

One form of the present invention will now be described by way of example with reference to the accompanying drawings, in which:

Figure 3 is an end view of Figure 2,

Figure 4 is a section on the line IV—IV of Figure 2,

Figure 1:
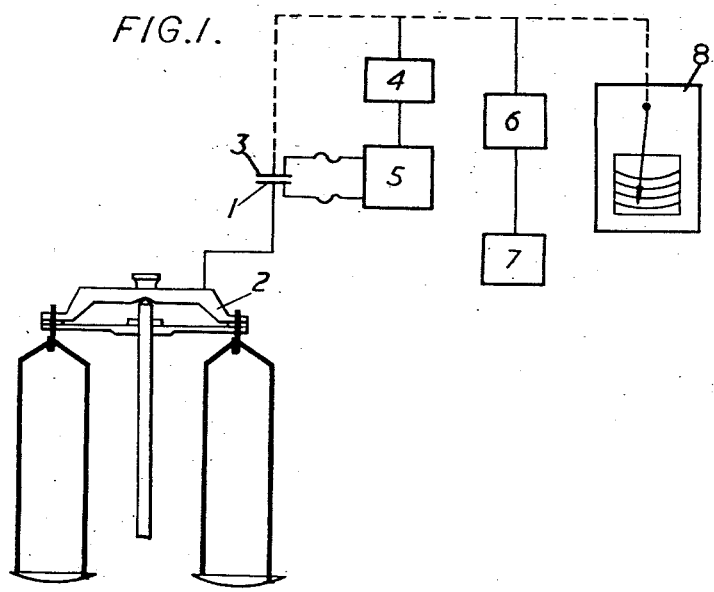
Figure 1 is a diagrammatic representation of the system.

Referring now to Figure 1, in the arrangement illustrated the sensing device comprises a capacitor, one electrode 1 of which is mounted on the balance beam 2 so as to move therewith and the other electrode 3 is mounted so as to be movable towards and away from the electrode 1 under the control of a servo-motor 4. The electrodes are connected electrically with a device 5 which is responsive to changes in capacity and controls the servo motor 4 in such a manner that following a movement of the beam and the electrode 1 the electrode 3 will be moved to restore the capacity between the electrodes to its original value. The electrode 3 will thus follow the movement of the beam and the angular movement of the servo motor will also be proportional to the beam movement. The servo motor is also arranged to operate limit switches 6 which, as will be described below, control weight loading mechanism 7, and may also be used to drive the pen of a recorder 8.

Figure 6:
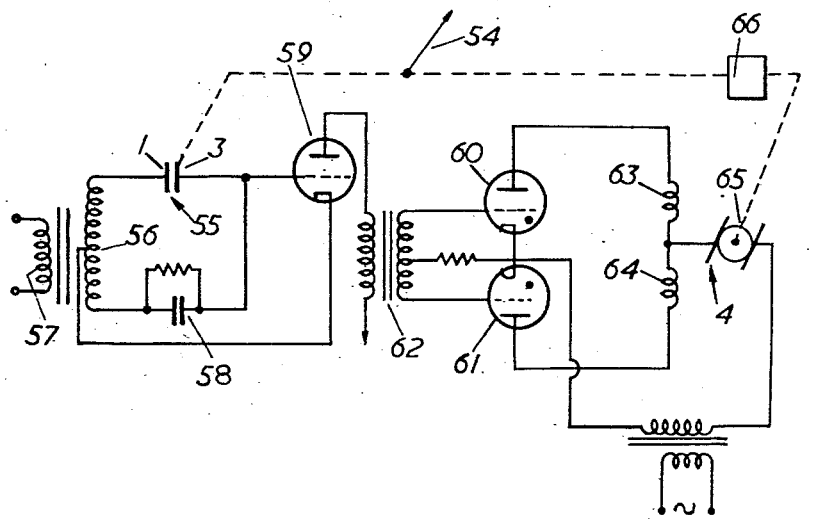
Figure 6 is a schematic illustration of the control mechanism.

While the device 5 may take various forms which would be familiar to electronic engineers, a simple form of this device is illustrated by way of example in Figure 6. In this arrangement, the balance capacitor 55, that is to say the capacitor comprised by the electrodes 1 and 3 of Figure 1, is included in a form of bridge circuit which consists also of the centre tapped secondary winding 56 of a transformer, the primary winding 57 of which is energised from a source of alternating current, and a reference capacitor 58. A tube 59 has its grid and cathode connected across a diagonal arm of the bridge and this tube receives an input signal which varies in magnitude and phase according as to whether the impedance of the balance capacitor 55 is greater or less than the impedance of reference capacitor 58. The output of tube 59 is applied, after amplification if necessary, to two thyratrons 60 and 61 which are connected in known manner in push-pull by input transformer 62, while the anode circuit of the thyratrons includes the split field windings 63 and 64 and the armature 65 of the servo motor 4, which in this particular example may be of the universal type. The armature 65 is mechanically coupled through reduction gearing 66 to drive the pen arm 54 of the recorder and to move the electrode 3 of the balance capacitor 55, the other electrode 1 of which is movable with the balance beam 2 (Figure 1).

In operation, and assuming that the balance beam and also the bridge circuit is balanced, if the weight loading of the balance is changed so as to separate the electrodes 1 and 3 of the balance capacitor, a signal will be applied to the tube 59 since the bridge becomes unbalanced, and one of the thyratrons, say the thyratron 60, will fire, thereby causing a flow of current through the armature 65 and the field winding 63 of the servo motor. This motor then operates to move the pen arm of the recorder and simultaneously to move the electrode 3 towards the electrode 1 so as to restore the balance of the bridge and when this occurs the thyratron 60 wil be extinguished and the motor accordingly stops. Conversely, if the electrodes 1 and 3 are brought closer together by the movement of the balance beam, the other thyratron 61 will fire, energising the armature 65 and field winding 64 and thus causing the motor to operate to move the electrode 3 away from the electrode 1 so as to restore the original spacing and to bring the bridge once more into balance. The arrangement thus operates in such a manner that the electrode 3 follows the movement of electrode 1 and the consequent movement of the pen arm 54 will accordingly reproduce on the record chart the movement of the balance beam.

Figure 2:
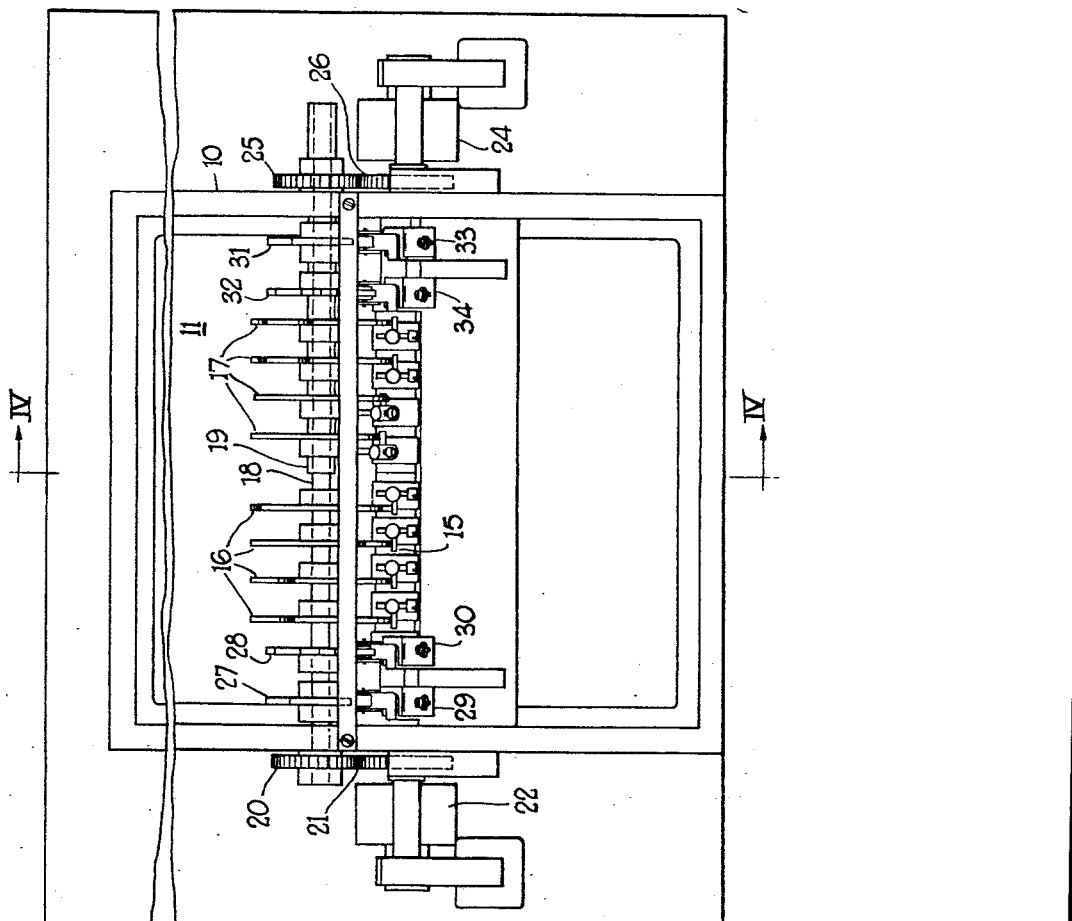
Figure 2 shows a rear view of the weight loading mechanism.

Referring now to Figures 2, 3 and 4, the weight loading mechanism there shown is mounted in a frame 10 to which is secured a panel 11. The mechanism comprises weight loading arms 12 of which there are two sets of four. These arms are each pivotally mounted on a fixed shaft 13 which extends behind the panel 11 opposite apertures through which the rods project. The front ends of the rods are provided with weight carrying hooks 14 while the rear ends are formed with cam followers 15. The rods are operated by two sets 16, 17 of four cams, one cam for each rod, the set 16 being mounted for rotation on a spindle 18 and the other set on a sleeve 19 through which the spindle passes. Each cam is designed so that when rotated it raises its associated arm or allows it to fall, the arm in its lowered position applying the weight attached to its hook 14 to the beam of the balance and in its raised position lifting the weight clear of the beam. Each set of arms carries weights, for example in the ratio of 1:2:2:5, and the set of cams are so designed that as they are rotated through one revolution the weights are applied in combinations appropriate to give any total weight between 0 and 9 units. A manually operated arrangement of this general nature is of course well known in precision balances. The second set of four arms and cams may be used to apply a second set of weights which, for example, may be ten times the value of the first set but in this specific case are used as will be described later to act in opposition to the first set.

The spindle 18 and cam set 16 are driven through gearing 20 and 21 by an electric motor 22, which preferably is of the synchronous type, and the motor also drives, through gear 21, a disc 23 the edge of which may be seen through an aperture in the panel 11 and which is engraved so as to indicate the value of the weight applied.

The sleeve 19 and cam set 17 are likewise driven by an electric motor 24 through gearings 25 and 26 and an indicating disc is also provided to show the value of weights applied or removed by the set of cams.

Two further cams 27 and 28 are provided on the spindle 18, the cam 27 being a homing cam having one point which operates on a micro-switch 29 and the cam 28 being a self-retaining cam having ten points operating on a micro-switch 30. In similar manner the sleeve 19 is provided with a homing cam 31 and a self-retaining cam 32 operating on respective micro-switches 33 and 34.

Figure 5:
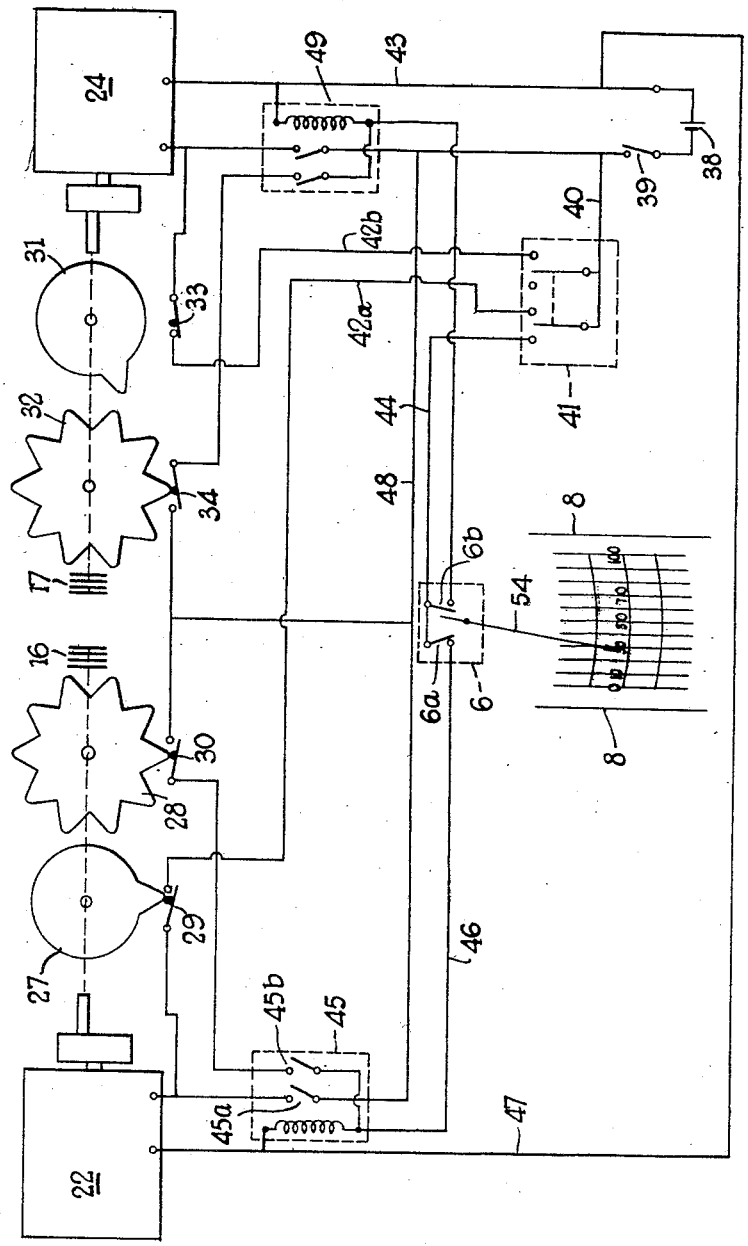
Figure 5 is a wiring diagram of the electrical circuit of the weight loading mechanism.

Figure 5 shows a wiring diagram of the arrangement and will serve to explain the operation of the system shown in Figure 1 taken in conjunction with Figures 2, 3 and 4. As shown, the system is energised from a source of electricity, here shown for simplicity as a battery 38, although in practice, since it is desired that the driving motors 22 and 24 will be synchronous motors, part or all of the system will be operated from a source of alternating current. The battery connections pass through a main switch 39 and over lead 40 to one terminal of a double-pole two-way switch 41. With the switch in its left-hand position the apparatus will be operative and in a condition automatically to change the weight loading as required. When the switch 41 is in its right-hand position, however, the weight loading apparatus will be caused to operate until it reaches a "home" position when all the weights of a set are either removed from or applied to the balance beam. With the switch 41 in the home position, it will be seen that one terminal of the battery is connected through lead 40 and the leads 42a and 42b with the micro-switches 29 and 33. Since the homing cam 27 and with it the weight loading cam set 16 are already in their home position, the peak of cam 27 has opened the micro-switch 29 and nothing further can happen. The homing cam 31 and with it the cam set 17 are, however, not in their home position and micro switch 33 is closed so that motor 24 will be connected with the battery 38 over leads 40 and 42b, switch 33, and lead 43. The motor will then operate to drive the cams and will continue to do so until switch 33 is opened by the peak of cam 31 in the home position.

Considering now that the switch 41 is turned to its left-hand or operating position, the battery is then connected through lead 40, switch 41 and a lead 44 with the servo-operated switches 6. These switches are shown as operated by the servo-operated pen arm 54 of the recorder 8 but they could equally be operated by another part of the servo system, so long as the switch 6a is closed when the pen reaches its maximum position and the switch 6b is closed when the pen reaches its minimum position. Assuming that owing to change in weight of the object being weighed the pen reaches its maximum position and the switch 6a is closed, the motor 22 will be energised to drive the cam set 16 so that weights are removed in steps of 100 units until the pen is brought back on the chart when the motor will stop. Likewise if the pen reaches its minimum position, the motor 24 will be energised to drive the cam set 17 whereby weights will be added step by step until the pen comes on to the scale again.

This action is achieved in the following manner: If the switch 6a is closed, the battery 38 will be connected across the operating coil of a relay 45 through lead 40, switch 41, lead 44, switch 6a, lead 46 and the lead 47. When the relay is energised, it closes its contacts 45a and 45b. The closing of contact 45a connects the motor 22 across the battery through the leads 47 and 48 while the closing of the contacts 45b causes the micro-switch 30 to be connected in parallel with the servo-switch 6a. The purpose of this latter connection is to ensure that the motor only stops when the cams are in predetermined position. As soon as the balance beam has been restored by the addition of weights to a position within its range of sensitivity and the pen of the recorder is consequently on the operative part of the chart, the servo-switch will open and the relay 45 would be de-energised. However, as soon as the motor 22 moves its cam set 16, movement of the cam 28 will allow the micro-switch 30 to close to complete the circuit through the contacts 45b which operates to hold the relay energised even though switch 6a opens. The motor will thus continue to run until the next point on the cam 28 opens the micro-switch 30 when, if the switch 6a has been opened, the relay will be de-energised and the motor 22 will stop. This operation ensures that the motor only stops when the micro-switch 30 is opened by the cam 28 and this cam is so positioned that this only occurs when the weight loading arms controlled by the cams 16 are either fully up or fully down, in which positions they and the weights they carry cannot foul the beam as it swings.

The motor 24, cams 31, 32 and 17 operate in exactly the same manner under control of the servo switch 6b and the relay 49 and the circuit is the same.

In the apparatus described both sets of weights and the object to be weighed are effective on the same end of the balance beam and accordingly the motor 24 and cam set 17 operate to add weights to the balance if the weight of the object increases beyond the sensitivity range of the beam while the motor 22 and cam set 16 operate to take off weights if the weight of the object falls below the sensitivity range of the beam. In an alternative arrangement the two sets of weights could operate on opposite ends of the beam. It will be appreciated that the same result could be obtained by using only one motor and set of cams and weights if the motor were made reversible. In practice, however, such an arrangement is more difficult to make and is also more expensive. It will also be appreciated that the number and value of weights in each set as well as the number of sets may be varied. There might, for example, be more or less than four weights in each set and these weights need not be in the ratio of 1:2:2:5, ratios of 1:1:2:5, 1:2:3:5 and 1:3:9:27 are examples of other ranges that can be used. There may also be more than one set of weights operating in each direction, the sets being arranged, for example, as decades and likewise all sets could be operative in the same direction. Such variations will be determined by the particular use to which the balance is to be put and the necessary alterations required will be understood by those skilled in this art.

Other variations in the design and construction of the system may be made within the scope of the invention. For example, while it is preferred to use synchronous motors for driving the cam sets, since this gives a constant operating time, other types of motors may be successfully used. The cams may also be made of a shape which is different from that shown and in particular the homing cams 27 and 31 may be formed with a valley instead of a peak for the opening of the micro-switches 29 and 33 in the home position of the cam sets.

While the arrangement of the invention may be used for automatic weighing in the sense that once a load has been applied to the balance the mechanism will come into operation to adjust the weight loading until balance is achieved, the principal use of the invention is in connection with continuous or continuously recorded weighing. In this form of operation the balance is brought into equilibrium after a load has been applied and the mechanism then takes charge to maintain the balance beam within its range of sensitivity despite changes in weight of the load. By the automatic addition or removal of weights each time the beam approaches or reaches the end of its travel, the range of weight change recorded may be extended up to the full capacity of the balance and this change may be read off suitably arranged indicating dials controlled by the mechanism. In the case of continuously recorded weighing the number of beam excursions may be deduced from the number of times the pen reaches the limits of the recording chart.

What we claim is:

1. A precision balance of the type in which the deflection of the beam between limiting positions in a range of equilibrium is indicative of a range of weight and adapted for continuous weighing over a total range greater than said range of weight, comprising motor driven weight loading mechanism, an electric sensing device responsive to the deflection of the balance beam, said sensing device including a first electrode mounted on said beam, a second electrode movable with respect to said first electrode, control means responsive to changes in electrostatic capacity between said electrodes, a servo motor operated by said control means to move said second electrode to maintain the spacing of said electrodes constant at all positions of the beam, and limit switches operated by said servo motor at positions corresponding to the limits of equilibrium of said beam selectively to energize said motor driven weight loading mechanism to restore the balance beam to a position within its range of equilibrium.

2. A precision balance of the type in which the deflection of the beam between limiting positions in a range of equilibrium is indicative of a range of weight and adapted for continuous weighing over a total range greater than said range of weight, comprising mechanism including a servomotor for following the deflection of the beam within its range of equilibrium, said servomotor including a rotatable member the angular position of which is proportional to the deflection of the beam, a limit switch operable by said rotatable member at a position thereof corresponding to a limiting position of said beam, means including a rotatable shaft for changing the weight loading of said beam in steps, each substantially equal to the said range of weight, as said shaft is moved through predetermined angular positions, a self-retaining cam on said shaft, a retaining switch adapted to be operated by said cam at each of said angular positions of said shaft, an electric motor for rotating said shaft, and circuit means including said limit switch and said retaining switch for energizing said motor to rotate the said shaft and thereby to change the weight loading when said beam reaches a limiting position and for de-energizing said motor when said shaft reaches the next of said predetermined angular positions following the return of said beam to a position within its range of equilibrium.

3. A precision balance as claimed in claim 2, including means for recording the deflection of the beam within its range of equilibrium comprising a chart and a recording pen operatively connected with the movable member of said servomotor.

4. A precision balance of the type in which the deflection of the beam between limiting positions in a range of equilibrium is indicative of a range of weight and adapted for continuous weighing over a total range greater than said range of weight, comprising mechanism including a servomotor for following the deflection of the beam within its range of equilibrium, said servomotor including a rotatable member the angular position of which is proportional to the deflection of the beam, two limit switches operable by said rotatable member at respective positions corresponding to the limiting positions of said beam, a first weight loading mechanism for changing the weight loading of said beam in one direction in steps each substantially equal to the said range of weight of said beam, a second weight loading mechanism for changing the weight loading of said beam in the other direction in steps each substantially equal to said range of weight of said beam, each said weight loading mechanism including a rotatable shaft, a plurality of cams on said shaft effective to apply weights to and remove weights from said beam as said shaft is rotated, a self-retaining cam on said shaft and a retaining switch operable thereby at predetermined angular positions of said shaft, and an electric motor for driving said shaft, and circuit means including said two limit switches and each said retaining switch for selectively energizing the driving motor of the appropriate weight loading mechanism when a limit switch is operated and for de-energizing the same motor when the shaft driven thereby reaches the next predetermined position following the return of the beam into a position within its range of equilibrium.

5. A precision balance as claimed in claim 4, including means for recording the deflection of the beam within its range of equilibrium comprising a chart and a recording pen operatively connected with the movable member of said servomotor.

References Cited in the file of this patent
UNITED STATES PATENTS

| | | |
|---|---|---|
| 1,851,703 | Hamilton | Mar. 29, 1932 |
| 1,916,962 | Bryce | July 4, 1933 |
| 2,387,242 | Carliss | Oct. 23, 1945 |
| 2,392,023 | Cooper | Jan. 1, 1946 |
| 2,597,831 | Willis | Mar. 4, 1947 |
| 2,709,076 | Hansen | May 24, 1955 |